United States Patent [19]
Pfingsten et al.

[11] 3,785,568
[45] Jan. 15, 1974

[54] PARTICULATE MATERIAL DISTRIBUTING MEANS

[76] Inventors: Eddie M. Pfingsten; Jerry L. Travis, both of 615 Russell St., Mulvane, Kans. 67110

[22] Filed: July 5, 1972

[21] Appl. No.: 269,199

[52] U.S. Cl............... 239/310, 239/346, 239/369, 222/193
[51] Int. Cl............................................. A62c 5/02
[58] Field of Search............... 239/310, 340, 346, 239/369, 318; 222/193

[56] References Cited
UNITED STATES PATENTS
| | | | |
|---|---|---|---|
| 1,610,714 | 12/1926 | Smith | 239/318 X |
| 1,791,624 | 2/1931 | Jessup | 239/369 X |
| 2,612,403 | 9/1952 | Burch | 239/318 |
| 1,848,708 | 3/1932 | Gatchet | 239/318 X |

Primary Examiner—Allen N. Knowles
Attorney—John H. Widdowson

[57] ABSTRACT

A particulate material distributing device removes particulated material from a container and disperses it in a fluid stream in a vertical direction away from the container. The device has a container for a quantity of particulate material, a particle conduit mounted with the container having an inlet in the container and an outlet outside the container, the outlet thereof being oppositely directed relative to the inlet. An operating fluid conduit is connected to the particle conduit and has a control valve connected with the operating fluid conduit to regulate the introduction of the operating fluid.

8 Claims, 4 Drawing Figures

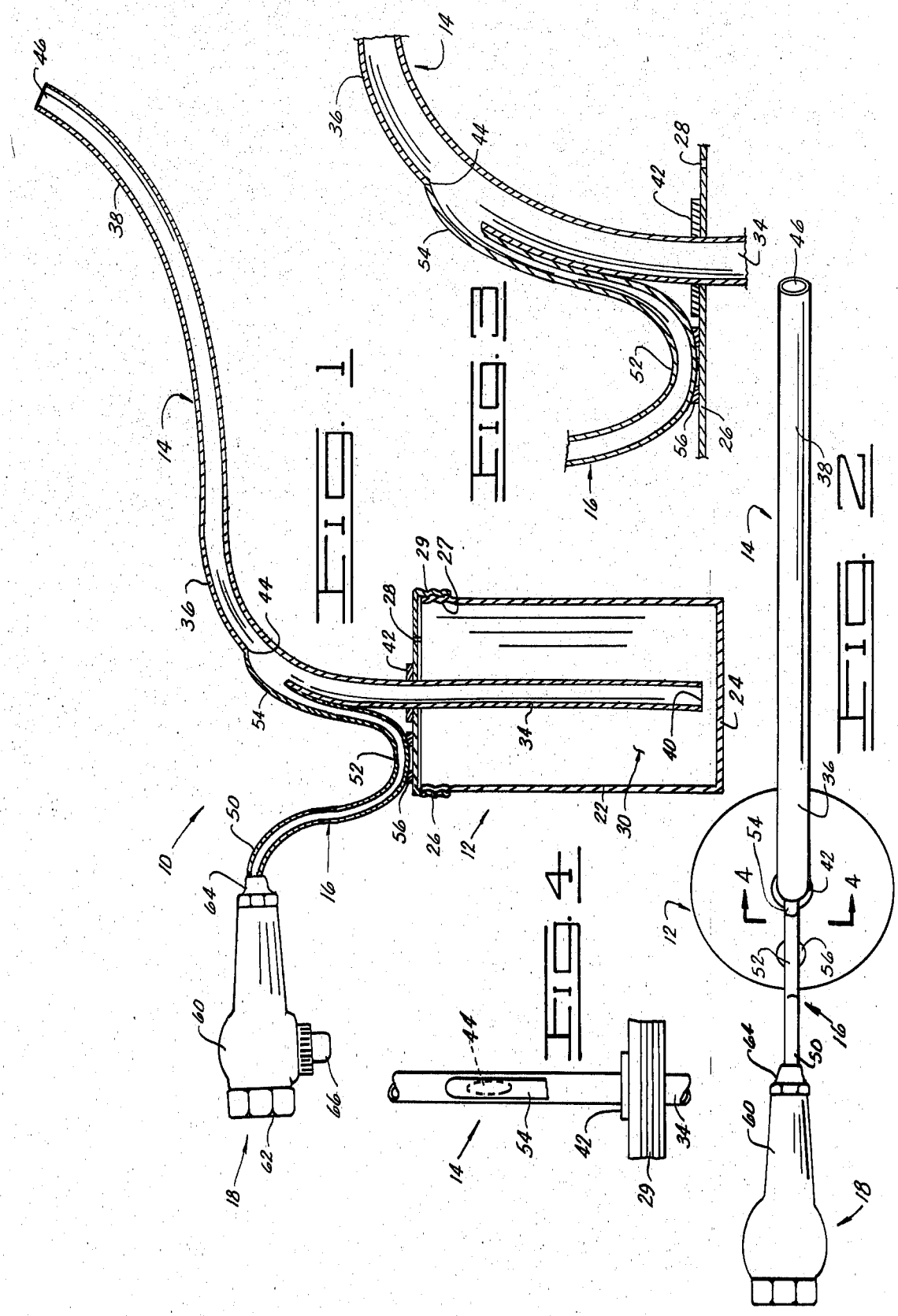

PARTICULATE MATERIAL DISTRIBUTING MEANS

Numerous types of material distributing guns and spraying devices are known in the prior art as operable to distribute liquid materials and solid particulate type materials. Some of the prior art devices are constructed with a stationary container and conduits connecting the container to a discharge nozzle which is hand held and used for directing the flow of the distributed material; other spraying devices have the material container at the distributing nozzle or adjacent thereto, wherein the container is small and the device is hand held and easily moved to direct the flow of discharge material. Of these prior art devices no type is particularly adapted for spraying solid particulate material in a vertical direction as would be needed for spraying the material on the bottom of a horizontal surface such as a ceiling. The spraying devices with the remote containers can be used for spraying in a vertical direction; however, they are somewhat inconvenient due to the bulk of the apparatus itself and the need for a discharge conduit that will pass the solid particulate material without clogging. The hand held type spraying devices are likewise not particularly adapted for spraying in the vertical direction since they are constructed primarily to spray in a horizontal direction and have the handle, container, and discharge outlet of the discharge nozzle arranged so the device will spray in a horizontal direction very well yet will not operate when spraying in the vertical direction due to the limitations of the material container and the material pick-up conduit arrangement of the container. Many of the hand held spraying devices for distribution of solid particulate material have an aerating apparatus within the container which will only function when the container is in a generally upright position and the particle discharge is in a horizontal direction; when these devices are rotated so that the discharge is directed vertically, the aerating device will cease to operate thereby no longer aerating or distributing the particulate material.

Many modern buildings are constructed with the ceilings thereof having a rough plastic-like coating which is intended to be decorative. This type of ceiling often has highly reflective particles placed on the surface thereof after the ceiling surface is applied for the purpose of further adding to the decorative appearance. The reflective particles are generally called glitter and are flakes of solid, highly reflective material. Heretofore no device was known in the art to specifically apply the glitter material on a ceiling. The prior art spraying devices do not operate well in this capacity because they will not spray material vertically upward consistently or accurately. Heretofore in the art and building trade the glitter material is applied by simply throwing the material at the ceiling before it is dry in hopes that it will reach the ceiling and stick; this manner of application is very time consuming, wastes much material and will not always give a uniform glitter coating.

In one preferred specific embodiment of this invention a particulate material distributing device is provided for the distributing of particulate material in a vertically upward direction. In the embodiment, the particulate material distributing device includes a container for particulate material, a particle conduit mounted with the container and constructed to direct particulated material in an operating fluid flow in a vertical direction, and having an operating fluid conduit connected to the particle conduit adapted to introduce an operating fluid into the particle conduit, the operating fluid conduit having a control valve to regulate the flow of operating fluid. The particle conduit is mounted with the container having the inlet thereof inside the container and the outlet thereof outside the container with the physical arrangement of the container and the conduit such that the inlet and outlet of the conduits are oppositely directed. The particle conduit is provided with a curved portion wherein the operating fluid conduit is joined therewith. The operating fluid conduit is shaped to coincide with the curvature of the particle conduit for a short distance and is curved to intersect with it at an aperture in the particle conduit wall. The control valve is connected to the opearating fluid conduit to regulate the flow of operating fluid through the distributing device. The distributing device is adapted in operation to pass a gaseous fluid through the operating fluid conduit and into the particle conduit whereupon vacuum pressure created in the particle conduit removes particulate material from the container passing same through its inlet portion, through its other portions and discharging same in a generally vertical direction through the outlet end thereof in the fluid stream of the operating fluid. Particularly, the particulate material distributing device is adapted to remove a finely granulated particulate material or a flake-like particulate material from the container.

One object of this invention is to provide a particulate material distributing device overcoming the aforementioned disadvantages of the prior art devices.

Still, one other object of this invention is to provide a particulate material distributing device that can be hand held and is adapted to direct particulate material of a finely granulated or flake form in an operating fluid stream in a generally vertically upward direction.

Still another object of this invention is to provide a particulate material distributing device which has a portable container with a particle conduit extending therefrom having the discharge end thereof arranged so as to move the particulate material in an operating fluid stream into the atmosphere in a generally vertical direction.

Yet, another object of this invention is to provide a particulate material distributing device that is portable and has a container with a particle conduit extending therefrom having the inlet in the container and the outlet outside of the container, the inlet and the outlet of the conduit being oppositely directed, the particle conduit being connected to an operating fluid conduit with a control valve adapted to pass a pressured operating fluid into a curved portion of the particle conduit so as to produce in operation a reduced pressure within the container, relative to the atmosphere which operates to remove particulate material from the container.

Yet one additional object of this invention is to provide a particulate material distributing device which is portable and has a container with a particle discharge conduit extending therefrom adapted in operation to provide a means of distribution of solid particulate material stored in the container into a generally vertical direction such as onto the ceiling of a room.

Various other objects, advantages, and features of the invention will become apparent to those skilled in the art from the following discussion, taken in conjunction with the accompanying drawing, in which:

FIG. 1 is a side elevation view of the distributing device with portions thereof shown in cross-section for clarity;

FIG. 2 is a top plan view of the device;

FIG. 3 is an enlarged cross-sectional elevation view of a portion of the distributing device including a portion of the container, a portion of the particle conduit, and a portion of the operating fluid conduit; and FIG. 4 is an enlarged elevation view of a portion of the device taken on line 4—4 of FIG. 2, showing a portion of the container cover, and a portion of the conduits, and having the particle conduit-operating fluid aperture shown in dashed lines.

The following is a discussion and description of preferred specific embodiments of the particulate material distributing device of this invention, such being made with reference to the drawing, whereupon the same reference numerals are used to indicate the same or similar parts and/or structure. It is to be understood that such discussion and description is not to unduly limit the scope of the invention.

Referring to the drawing in detail and in particular to FIG. 1, the device of this invention is shown in a partially cross-sectional view and is indicated generally by the numeral 10. The material distributing device 10 includes a container 12, a particle conduit 14, an operating fluid conduit 16, and control valve 18. The particle conduit 14 has the inlet inside the container and the outlet outside of the container with the outlet directed generally opposite to the inlet and the conduit having a curved center portion. The operating fluid conduit 16 has a control valve 18 and is connected to the particle conduit 14 in the curved portion thereof.

The container 12 is preferably a cylindrical structure with a sidewall 22, bottom 24, and a cover 26. The cover 26 is secured to the particle conduit 14 and has a passageway therethrough for the particle conduit 14 as shown clearly in FIGS. 1 and 3. The container 12 is vented through the cover 26 by means of an aperture 28 through the top of the cover. The cover 26 and the container sidewall 22 are preferably threadedly engaged to provide for easy removal of the cover 26 from the remainder of the container 12. The upper portion of the container sidewall has a threaded portion indicated at 27. The cover 26 has a lip portion 29 that extends over the upper portion of the sidewall and is threaded on the interior to mate with the threaded sidewall portion 27. The inlet portion of the particle conduit 14 preferably passes through the center of the container 12 and terminates in the lower portion of its interior cavity. The interior cavity of the container 12 is generally indicated at 30 and is bounded by the side 22, bottom 24, and cover 26.

The particle conduit 14 has an inlet end portion 34 within the container 12, a curved center portion 36, and an outlet end portion 38. The inlet end portion 34 of the particle conduit is straight and has an open end 40. The particle conduit 14 is joined with the cover 26 at the upper end of the inlet portion, where it passes through the cover. The particle conduit 14 is preferably soldered or welded to the container cover 26 and has a supporting ring or washer 42 around it at the juncture of the conduit 14 and the container cover 26 as shown clearly in FIG. 3. The ring member 42 provides a strengthening support for the container 12 which is desirable since it is carried by the particle conduit 14, operating conduit 16 and control valve 18 when in use. Depending upon the exact materials of construction of the distributing device 10, the connection between the cover 26 and conduit 14 can be accomplished by means other than welding or soldering. The curved portion of the conduit 36 is preferably shaped in the form shown in FIG. 1 and FIG. 3, having a first curved portion 36 adjacent to its connection with the container 12, and a second radially larger curved portion at the outlet portion 38. The first and second curved conduit portions 36 and 38 are oppositely arcuately curved. The first curved portion 36 of the particle conduit 14 has an aperture 44 in its radially larger or outer side, as shown. The aperture 44 is connected with the operating fluid conduit 16 to provide admission of the operating fluid into the particle conduit 14. The first curved portion 36 is preferably constructed with a smaller radius than the outlet curved portion 38. The aperture 44 is oval shaped and spaced a significant distance above the top of the container as shown clearly in FIG. 3, so as to be in the center portion of the curved portion 36. The outlet portion 38 of the particle conduit is curved with the open outlet end 46 directed generally opposite to the conduit inlet 40 and the container 12; this in operation provides for direction of the fluid flow and its contained solid particulate material in a direction opposite to that of the container 12. The particle conduit 14 is preferably constructed in one plane, as shown in FIG. 2, with the various portions thereof curved in that plane.

The operating fluid conduit 16 has the inlet end thereof 50 connected with the control valve 18, the U-shaped center portion 52 mounted with the container cover 26, and the outlet 54 connected with the particle conduit curved portion 36 as shown clearly in FIG. 1 and FIG. 3 of the drawing. The operating fluid conduit 16 is preferably formed in the general shape shown in the drawing wherein the inlet portion thereof 50 is generally horizontal and the outlet portion thereof 54 is curved along with and joined with the particle conduit's curved portion 36. The operating fluid conduit 16 is joined with the container cover 26 in its center portion 52 to provide structural support for the control valve 18. The operating fluid conduit U-shaped center portion 52 is preferably welded or soldered to the container cover 26 at its arcuate portion and has a ring-like support member 56 at its junction with the container cover 26 as shown in FIG. 3. The ring-like member 56 is basically washer sized to allow the outer curved portion of the conduit 16 to come near or, if desired, contact the container cover 26. The purpose of the ring member 56 is to provide additional bracing or structural support for the operating fluid conduit 16 in its juncture with the container cover 26. In the event the container cover 26 and operating fluid conduit 16 are constructed from materials other than metal, the joining of the conduit 16 and the container cover 26 can be accomplished easily by means other than welding or soldering, the exact means being compatible with the type of material from which the pieces are constructed. The outlet end portion 54 of the operating fluid conduit 16 is constructed so as to cover the particle conduit aperture 44, as shown. The aperture 44 is smaller than the outlet end of the operating fluid conduit 16 and is enclosed within the confines of the juncture of the operating fluid conduit end portion 54 and the curved portion 36 of the particle conduit 14. The outer end portion of the operating fluid conduit end portion 154 is shaped to curve over the aperture 44 with the remainder of the end portion 54 curved to align with the curvature of the particle conduit 14 in that area.

The curvature of the conduits 14 and 16, including placement and shape of the aperture 44 is preferably similar to that shown in the drawing, for such in practice has been found to provide for effective operation of the distributing device 10. Additionally, the curvature shown is preferred because the control valve 18 and curved portions of the conduits function as a handle and can easily be used by a person operating the device. The arrangement of the conduits and the control valve 18 is such that a person can hold the device with one hand in several comfortable positions, or in the alternative a person may, if he so desires, hold the apparatus with two hands.

The control valve 18 is preferably a push button operated valve rigidly mounted with the operating fluid conduit 16 that is adapted to control fluid flow from a pressurized reservoir through the distributing device 10. The control valve 18 is preferably provided with an internal valve mechanism which will allow the high pressure fluid to be easily released into the operating fluid conduit, either in a full flow manner or in a restricted manner. In operation, the distributing device 10 may require some variation in the operating fluid flow, depending upon the pressure of the source of fluid. In practice it has been found that approximately 25 p.s.i. air is sufficient to remove small lightweight particulate material from the container 12. As shown in FIG. 1, the control valve has an inlet 60, an outlet 64, and a push-button operator 66. Preferably the control valve 18 is mounted with the distributing device 10 in the position shown wherein the push button 66 is pointed in the same direction as the container; this configuration enables an operator to grasp the control valve in one hand and squeeze the push button, moving it upward, with one finger while continuing to hold the control valve and support the device with the other fingers and thumb. In operation the control valve push button 66 is moved upward into the control valve body 60. The control valve inlet 62 is connected to a source of high pressure operating fluid. The control valve outlet 64 is securely mounted or attached to the operating fluid conduit inlet portion 50 at the inlet end thereof. The conduit inlet end portion 50 can be secured to the control valve 18 by numerous means, depending upon the structure of the valve outlet and the sizes of the various pieces.

In the use of the particulate material distributing device 10, such has been repeatedly used and proven in the distributing of glitter or flake-like particulate, reflective material onto the ceiling of a room. In this use of the device 10, glitter material is placed in the container and removed in operation of the device by utilizing air pressure supplied from a typical and conventional paint spraying apparatus to act as the operating fluid. In this use the glitter material from the container and in the air stream is dispersed in a vertical and upward direction impacting same on the ceiling of a room. In this instance, glitter material is of a finely divided rectangular flake-like form, the individual glitter particles being reflectively coated and approximately one-sixteenth of an inch on the sides. This type of glitter material and other similar finely divided, particulate, reflective materials are used in the construction of modern buildings where same is sprayed onto the ceiling of the rooms for decorative purposes and to enhance lighting characteristics.

In the actual operation of the device, regardless of what material is placed in the container, actuation of the control valve 18 passes the operating fluid through the conduit 16 and into the particle conduit 14 at the oval aperture 44. The operating fluid in the conduits 14 and 16 is at a higher pressure than in the surrounding atmosphere and in the container 12. Due to the construction of curved conduit portions and the construction of their juncture at the aperture 44, a reduced pressure is created in the particle conduit inlet portion 38 which draws the particulate material from the container 12 into the inlet 40 of the particle conduit. The pressure in the interior of the container 12 is substantially atmospheric due to its communication with the atmosphere through the vent aperture 28 in the cover 26. Pressure in the lower portion of the container, particularly in the space around the particle conduit inlet 40 is lower than the surrounding pressure; this is the force which moves the particulate material into the particle conduit 14 and raises same to the curved portion 36. When particles of the particulate material are inside the particle conduit, the reduced pressure and air flow move them upward through the inlet portion 34 into the curved portion 36. When the particles are in the curved portion 36 of the particle conduit, the pressure of the operating fluid in that area moves them through the conduit outlet portion 38 whereupon they pass through the outlet 46 into the atmosphere, and are further carried by the operating fluid flow a substantial distance. In practice it has been found that the reduced pressure or vacuum pressure created in the particle conduit inlet portion 34 is sufficient to remove substantially all of the particulate material from a container of the glitter material. In practice it has been found that a person operating the distributing device 10 can stand on the floor holding the device in one hand at a height between his waist and shoulders and spray glitter material onto a room's ceiling without the heretofore loss of a great amount of glitter material. The distributing device 10 allows a person to closely regulate the amount of glitter material dispersed onto the ceiling of a room and to accurately direct the flow so as to evenly coat a ceiling with the desired amount of material.

In addition to distributing glitter material the distributing device 10 is adapted to operate with other finely divided particulate material such as sand size particles or even smaller powder-like material in addition to the flake-like glitter material. Virtually any type of material which is not extremely heavy or so large as to clog the particle conduit 14 can be distributed with the device of this invention. Easy separation of the container wall 22 from the cover 26 enables the container 12 to be quickly and easily refilled when the supply of material therein has been distributed. Again, in the case of using the flake-like glitter material in the distributing device 10, such is packaged by many manufacturers in cans or containers which have threaded lids and contain one pound or so of the material. In this instance, if a distributing device 10 is to be used extensively with the glitter material, the cover 26 can be sized so as to fit the containers in which the glitter is normally packaged, thus further simplifying loading of the device by replacing the lower portion of the container with the package container of the glitter material. In a similar manner the container cover 26 can be constructed to fit other types of package containers to enable the distributing device to be easily secured with a package container of whatever particular material with which it is to be used.

In the manufacture of the particulate material distributing device of this invention, it is obvious that the structure can be easily formed and joined to achieve the end product. The conduits 14 and 16 can be formed from standard size conduits, including being cut and bent into the appropriate shapes. The container cover 26 can be easily joined with the conduit segments by appropriate means depending upon their material of construction. The control valve 18 does not need to be a valve with particularly special qualities or characteristics which would necessitate its special manufacture. The control valve 18 can be obtained from a type of valve normally used for controlling air under pressure. The container 12 can be made in a nominal size so as to hold a substantial amount of solid particulate material. The container can be the container in which a particular type of particulate material is packaged, provided the container cover 26 is appropriately constructed. The particle conduit and the operating fluid conduit can be sized sufficiently to allow the device to be used with a finely divided particulate material such as the glitter described, or it can be constructed larger or smaller depending upon the use and the specific material with which it is to be used.

In the use and operation of the particulate material distributing device of this invention, it is seen that same provides a means for removing particulate material from a container and project it into the atmosphere in an operating fluid flow in a vertical and upward direction. The structure of the distributing device is such that it is simple to operate, it has only moving parts in the operating fluid control valve, and it has a container which is adapted to be easily and quickly refilled. In the preferred use of the distributing device, such is constructed to be used with the package containers in which the material to be dispersed is normally packaged, thus further simplifying use of the device and allowing for a savings in terms of time and effort required to refill or reload the device. The distributing device is adapted to be operated with air or other gaseous fluids as the operating fluid function to remove the particulate material from the container by means of reduced or vacuum pressure created in the conduit. The distributing device can be held and operated by one hand of a person by simply grasping the control valve portion of the device in the hand and squeezing the valve actuator with one finger or the thumb thereby leaving the other hand free.

As will become apparent from the foregoing description of the applicant's particulate material distributing means, relatively simple and inexpensive means have been provided to remove particulate material from a container and disperse same in a gaseous fluid flow in a vertical and upward direction. The distributing device structure is economical to manufacture and simple in construction. The distributing device has no moving parts except for the moving parts of the control valve which are basically very simple. The distributing device is simple to use and lightweight and can be operated easily by a person using one hand. The discharge of the particulate material distributing device is such that particulate material is put in a vertically upward moving operating fluid flow and carried upward in the flow. The distributing device is particularly adapted for the distributing of reflective material or glitter onto a ceiling of a room during the construction and finishing thereof and provides a means to distribute the material in a regulated manner minimizing the loss of material while neatly distributing it.

While the invention has been described in conjunction with preferred specific embodiments thereof, it will be understood that this description is intended to illustrate and not limit the scope of the invention, which is defined by the following claims.

We claim:

1. A flake-like particulate material distributing means, comprising:
   a. a container for particulate material,
   b. an integrally formed particle conduit mounted with said container having an inlet end portion within said container, an arcuate outlet end portion outside said container directed oppositely relative said inlet end portion, and an intermediately positioned operating fluid inlet opening in an arcuate portion thereof outside said container curved opposite said outlet end portion, said inlet opening being oval shaped longitudinally,
   c. and integral therewith an operating fluid conduit having an inlet and an outlet, said outlet corresponding in shape to said operating fluid inlet opening and connected to same in fluid communication, said operating fluid conduit is curved in its outlet end portion to lie adjacent to said particle conduit in proximity to said operating fluid outlet, and
   d. an operating fluid control valve means in said operating fluid conduit,
said particulate material distributing means constructed and adapted in operation to remove particulate material from said container and pass same in a fluid stream to distribute said particulate material.

2. The distributing means of claim 1, wherein said particle conduit has said outlet end portion in the same plane as said inlet end portion and the portion of said operating fluid conduit adjacent the outlet thereof.

3. The distributing means of claim 2, wherein:
   a. said container is vented to the atmosphere.

4. The distributing means of claim 3, wherein:
   a. said container has a threadedly attachable cover on the upper portion thereof,
   b. said particle conduit inlet is mounted in said cover and extends therethrough a distance to terminate adjacent the bottom portion of said container when said cover is attached thereto, and
   c. said operating fluid conduit has a portion thereof adjacent said outlet portion secured to said cover at a point away from the point of connection of said particle conduit and having an opposite portion thereof in fluid communication with said valve means.

5. A flake-like particulate material distributing means, comprising:
   a. a container cover having means to attach a container,
   b. a particle conduit mounted with said container cover having an inlet end portion extending from said container cover constructed and adapted in operation to be placed within a container, an arcuate outlet end portion extending from said container cover oppositely directed relative said inlet end portion, and an intermediately positioned operating fluid inlet opening in an arcuate portion thereof, said outlet end portion curved opposite said outlet end portion, said inlet opening being oval shaped longitudinally, c. and integral therewith an operating fluid conduit having an inlet and an outlet, said outlet corresponding in shape to said operating fluid inlet opening and connected to same in fluid communication, said operating fluid conduit is curved in its outlet end portion to lie adjacent to said particle conduit in proximity to said operating fluid outlet, and d. an operating fluid control valve means in said operating fluid conduit, said particulate material distributing means constructed and adapted in operation to remove particulate material from a container when mounted with said container cover and pass same in a fluid stream to distribute said particulate material.

6. The distributing means of claim 5, wherein said particle conduit has said outlet end portion in the same plane as said inlet end portion and the portion of said operating fluid conduit adjacent the outlet thereof, and said container cover is transverse to said plane.

7. The distributing means of claim 6, wherein:
a. said container has an aperture therethrough adapted in operation to vent a container attached thereto.

8. The distributing means of claim 7, wherein:
a. said container has a threadedly attachable cover on the upper portion thereof,
b. said particle conduit inlet is mounted in said cover and extends therethrough a distance to terminate adjacent the bottom portion of a container when said cover is attached thereto, and
c. said operating fluid conduit has a portion thereof adjacent said outlet portion secured to said cover at a point away from the point of connection of said particle conduit and having an opposite portion thereof in fluid communication with said valve means.

* * * * *